United States Patent
Chen et al.

(10) Patent No.: US 7,503,012 B2
(45) Date of Patent: Mar. 10, 2009

(54) INVOKING USER DESIGNATED ACTIONS BASED UPON SELECTED COMPUTER CONTENT

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/756,108

(22) Filed: Jan. 13, 2004

(65) Prior Publication Data

US 2005/0154994 A1    Jul. 14, 2005

(51) Int. Cl.
*G06F 3/048* (2006.01)

(52) U.S. Cl. .............. 715/769; 715/770; 715/810; 715/822; 715/827; 715/860

(58) Field of Classification Search ............. 715/513, 715/760, 823, 770, 769, 540, 822, 860, 810, 715/827
See application file for complete search history.

(56) References Cited

U.S. PATENT DOCUMENTS

| | | | |
|---|---|---|---|
| 5,765,156 A | | 6/1998 | Guzak et al. ............... 707/100 |
| 5,956,736 A | * | 9/1999 | Hanson et al. .............. 715/513 |
| 6,177,939 B1 | | 1/2001 | Blish et al. ................. 345/770 |
| 6,268,852 B1 | * | 7/2001 | Lindhorst et al. ........... 715/744 |
| 6,309,305 B1 | | 10/2001 | Kraft ......................... 455/566 |
| 6,789,252 B1 | * | 9/2004 | Burke et al. ................ 717/100 |
| 6,891,551 B2 | * | 5/2005 | Keely et al. ................ 715/762 |
| 7,036,092 B2 | * | 4/2006 | Sloo et al. .................. 715/841 |
| 7,185,274 B1 | * | 2/2007 | Rubin et al. ................ 715/513 |
| 2002/0186255 A1 | * | 12/2002 | Shafron et al. ............. 345/810 |
| 2004/0205493 A1 | * | 10/2004 | Simpson et al. .......... 715/501.1 |

\* cited by examiner

*Primary Examiner*—Stephen S Hong
*Assistant Examiner*—Anil N Kumar
(74) *Attorney, Agent, or Firm*—Robert H. Frantz; David A. Mims, Jr.

(57) ABSTRACT

A program or system function on a computer system is automatically invoked by receiving a user-selected first insertion point or replacement area within a first user interface to a destination computer file. Subsequent to receiving the first insertion point within a destination file, a second user interface to content of a source computer file is provided upon user command. Then, responsive to a user highlighting text within the second user interface, the highlighted text is automatically copied from the application program to a clipboard buffer. Auto-trigger rules are searched for a rule which correlates to said highlighted text copied to the clipboard and, upon finding a correlating rule, one or more programs or system functions are invoked according to the found rule without need to modify or change said application program.

6 Claims, 14 Drawing Sheets

Figure 2 — Prior Art

| Name | Age | Miles Driven |
|------|-----|--------------|
| Bob  | 23  | 1023 |
| Jane | 44  | 925 |
| Hal  | 58  | 2041 |
"Our three drivers celebrate the conclusion of their trip to see all of the sites where Elvis Presley ate peanut butter sandwiches in public."
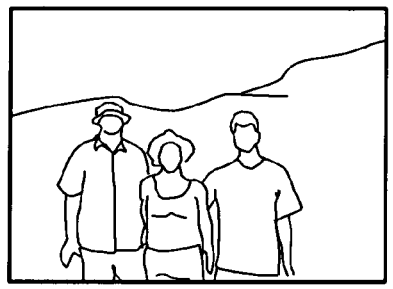
Figure 8

| Name | Age | Miles Driven |
|------|-----|--------------|
| Bob  | 23  | 1023 |
| Jane | 44  | 925 |
| Hal  | 58  | 2041 |
"Our three drivers celebrate the conclusion of their trip to see all of the sites where Elvis Presley ate peanut butter sandwiches in public."
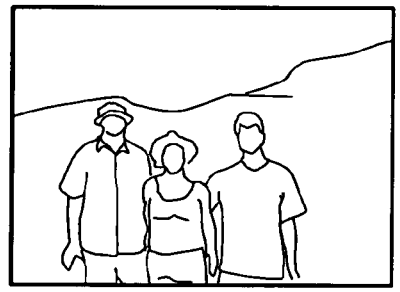
Figure 9

INVOKING USER DESIGNATED ACTIONS BASED UPON SELECTED COMPUTER CONTENT

CROSS-REFERENCE TO RELATED APPLICATIONS (CLAIMING BENEFIT UNDER 35 U.S.C. 120)

This application is related to U.S. patent application Ser. No. 10/455,159, filed on Jun. 5, 2003, and to U.S. patent application Ser. No. 10/703,018, filed on Nov. 11, 2003, both filed by Yen-Fu Chen.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related patent applications, U.S. patent application Ser. No. 10/455,159, filed on Jun. 5, 2003, and U.S. patent application Ser. No. 10/703,018, filed on Nov. 11, 2003, both filed by Yen-Fu Chen, are incorporated by reference, in their entireties including figures, to the present patent application

BACKGROUND OF THE INVENTION

1. Field of the Invention

This invention relates to the arts of computer user interfaces and data exchange between program entities such as instances of programs in a multi-tasking computer system, and especially to the triggering or invocation of user-designated computer processes upon selection of content in a document or computer resource.

2. Background of the Invention

Modern multi-tasking computers provide a variety of user interfaces for controlling multiple application programs and system functions which operate simultaneously. Some of the most widely used multi-tasking computer systems are personal computers ("PC") running a multi-tasking operating system ("OS") such as International Business Machines' ("IBM") OS/2™ or AIX™, Microsoft Windows™, and Apple Computer's MacOS™. Other operating systems may be used with personal computers as well as larger computers such as enterprise-class computers, such as UNIX, Sun Microsystems' Solaris™, Hewlett Packard's HP-UX™, and the "open sourced" LINUX. Smaller computing platforms such as held-held computers, personal digital assistants ("PDA"), and advanced wireless telephones may run operating systems targeted for such hardware including Palm Computing's PalmOS™ and Microsoft's Windows CE™. Additionally, there are many "proprietary" and less widely-used computing platforms and operating systems which also allow users to control and run multiple programs and system functions simultaneously.

Many of these systems will use tabs, icons, windows, frames, pages and special key combinations to allow a user to switch between user interfaces ("UI") for each program and system function which is being executed, or to start or stop the execution of a program or system function. For example, in a personal computer running MS Windows™, the user may first start a web browser program running using several methods (e.g. double clicking an icon on the desktop, selecting the program from a Start Programs list, operating a "hot key", etc.), and then may start a document editor program using similar methods. Each program establishes a user interface such as its own "window". The user can then control a program by selecting its window using one of several available methods, such as selecting a button or icon on a command bar, activating a "task list" and selecting a program, etc. As a result, a user can start and run many programs simultaneously, periodically switching between their user interfaces to accomplish work or entertainment tasks as needed. Other computing systems provide similar basic user control capabilities, albeit with a variety of user controls to switch between programs and system functions.

Users often wish to copy or transfer information or "content" from one program or system function to another. For example, a user may be preparing an invoice for a client using a word processor program, but may also be simultaneously using a database or spreadsheet program to perform various calculations. Using "copy and paste" functions of the application programs and the operating system, the user may select information from a source program (e.g. the spreadsheet), and "paste" it into the destination program (e.g. the invoice being edited). Such a process is so common place in computer users' daily lives that it is rote, albeit each user may know several sequences of actions for several computers which he or she commonly uses (e.g. one process on his home PC, another on his PDA, and another on his networked terminal at work). These memorized methods may typically include several steps of clicking on icons, dropping down lists, highlighting information, and using navigation controls within program UI's.

For example, turning to FIG. 1, a "windows" style user interface is depicted to illustrate a process of "copying" information from a web browser program to a word processor file via a "clipboard" memory. In this system, each program provides a window (2, 3, 104) which can be closed (9, 9') to end the program, maximized (8, 8') to view the full UI for that program, or minimized (7, 7') to leave the program running but deactivate the UI (e.g. clear the UI window from the screen). In this example, these controls are located in a command bar (4, 4') along the top of the UI window, but many other variations are known in the art.

Each UI window also typically has navigation controls such as left panning (15, 15'), right panning (13, 13'), and horizontal scroll (14, 14') controls, as well as up panning (10, 10'), down panning (12, 12'), and vertical scroll (11, 11'), for viewing areas of information and content not completely viewable in the UI. Information, icons, text, graphics, etc., are shown or displayed within (16, 18) the UI window according to the scroll and panning control settings. More recently, the term "content" (16, 18) has been used to collectively refer to all types of information which may be displayed or presented in a user interface, including but not limited to text, graphics, still images, animated images, video, audio, and hyperlinks.

Now suppose for the purpose of our example, the user has started a word processing program which provides a first UI window (2), and a web browser which provides a second UI window (3). Also suppose that the user is researching information on the Internet using the web browser while authoring a paper which is being edited simultaneously using the word processor.

In this example, the user has found information (19) at a hypothetical web address (17) that he wants to "quote" in his or her paper. So, the user must first move the cursor (104) in the word processor to select an insertion point for the information, then must switch to the web browser UI, select the text (19) in the source content, operate a "copy" command in the web browser UI which copies (101) the content into a buffer (100) such as a "clipboard", switch back to the word processor UI, and operate a "paste" or "insert" command, which results in the copied content (19) being inserted into the destination document at the point of insertion (103). The user can repeat this process for many different program UI's (106).

In some software and hardware configurations, the copy buffer may be provided within a suite of application programs which are "tightly coupled" or related. Such suites cooperate with each other in ways not possible with software programs provided by differing suppliers. In many cases, however, the operating system provides a buffer function which is generally accessible by all programs, such as the clipboard in the MS Windows™ operating system.

Also, in some situations, the original content with its original format may not be acceptable by the destination program, and as such, a specialized paste or insertion function (105) may be provided by the destination program or operating system which converts the content to a form useful by the destination program. For example, text copied from a web page may include color, size, font, style, and hyperlink reference information embedded in the base Hyper Text Markup Language ("HTML") of the source web page. However, not all word processors are able to interpret all of these special codes and identifiers, so a "paste as plain text" option may be provided by a converter or translator (105) function.

So, to illustrate the complexity and tedious nature of such ordinary operations, we present the steps in full to accomplish this example scenario of simply transferring a block of formatted text from a web page to a word processor program, starting from a point where the user is editing the destination document in the word processor:

(a) navigate to the insertion point in the destination document using the word processor UI window controls (e.g. multiple clicks on scroll, panning or page up/page down keys);

(b) optionally select text or content in the destination document which is to be replaced;

(c) switch to the web browser UI window (e.g. click on an icon in a task bar, activate a task list and pick a running web browser program, etc.);

(d) navigate in the web browser UI window to find the text or content desired to be transferred into the document (e.g. use panning, scrolling, or page up/page down keys);

(e) select the source content or text (e.g. click-and-drag over the content to highlight it)

(f) transfer the content to a copy buffer (e.g. click on "Edit" command, select "copy" option or type Alt-E, Alt-C);

(g) switch back to the word processor UI window (e.g. (e.g. click on a icon in a task bar, activate a task list and pick a running web browser program, etc.); and (h) operate a "paste" command in the word processor UI window (e.g. click on "Edit" command, select "paste" option or type Alt-E, Alt-P).

Each of these operations may actually require several steps (clicking, scrolling, selecting, typing, etc.), so this minimal process may represent 7 to 25 actual user actions. This process must be repeated for each block of text or content to be transferred from multiple program UI windows (106), and additional steps may be necessary to achieve a "special paste", as described above. Also, if the same text or content is to be inserted into the destination document for file at multiple locations, the last few operations of this process (h) in addition to some navigation actions must by performed by the user.

As a result, consolidating information from multiple sources of information may be extremely tedious, frustrating, and tiresome using the currently available methods and apparatuses provided in such computing systems. Some systems may provide notably more "user friendly" or intuitive methods, while other systems are much more difficult and "clunky" to use.

Turning to FIG. 2, this process is generalized. Starting at a point or time (21) when the user is actively working with the destination program UI, the user must navigate (22) within the present document, file, or other computer resource to a point where the content insertion is to be made, including selecting any content which is to be replaced. Then, the user must switch (23) to the UI of the first source of information, navigate (24) to the first source content to be transferred, select that content, and operate (25) a copy or cut control in the first source UI.

Next, the user must switch (26) back to the destination UI, and operate (27) an insert or paste command in that UI. If (28) the user wants to insert or paste that content into multiple destinations, the user must navigate (29) to each destination and operate (27) the paste or insert command in the destination program UI, until all insertions have been made for that source information.

If (200) the user desires to transfer information from other points in the same source, or from other sources, the user must repeatedly switch (201) to a source UI, navigate to a source content point, select source information, operate (25) a copy or cut operation, switch (26) back to the destination UI, and paste or insert (27) the content, until all information has been transferred.

Implied, but not shown in detail, in this generalization of the process can be multiple user actions for each general step. Optionally, options such as conversion of the content may be necessary, which requires additional user actions (e.g. the "paste as plain text" example).

So, it is not inconceivable that in the course of authoring a paper using a word processor and information from several sources, the user may have to perform hundreds of tedious actions, commands, selections, navigation operations, etc.

In this paradigm, certain conventions have evolved into place which only moderately simplify or reduce the burden of such operations. For example, performing a "cut" operation usually deletes the selected source content from the source file, and places a copy of it into the transfer buffer, sometimes overwriting the current contents of the transfer buffer. A "copy" operation typically leaves the selected information unchanged in the source and only places a copy of the information in the transfer buffer. Additionally, in the destination UI, a "paste" or "insert" command may copy the contents of transfer buffer to a selected point in the destination document or file, leaving a copy in the transfer buffer for additional pastes or insertions.

In some programs, a "paste special", "import from clipboard", or similar command may be available with several conversion options to perform a minimal conversion process on each transfer. However, even though the user may be performing the same "paste special" command over and over, the typical UI does not memorize or "learn" this process, so the user is forced to respond to a number of redundant options and dialogs on each paste operation.

The same user interface conventions are followed by many computer systems not only for content or information within a computer resource such as text and graphics within a file, but also for resources (e.g. files, shortcuts, icons, mappings, etc.) within a computing environment (e.g. file system, directories, folders, etc.). For example, when working with a MS Windows™ operating system and running the Windows Explorer program, a user may select a file, directory or folder to move, execute an "Edit-Cut" command sequence, navigate to another directory or drive, and execute an "Edit-Paste" command to move the selected resource to the new destination. Similarly, by selecting the source resource, executing a copy command, and then executing a paste command to one or more destinations, the original resource is not changed but copies of it are deposited at the destination points. Further, by selecting and copying a source resource, then selecting a destination resource, replacement of the destination resource may be accomplished.

The invention described in the related patent application entitled "System and Method for Content and Information Transfer Between Program Entities", filed by Yen-Fu Chen, et al., and incorporated herein, addressed this problem to a large degree. The related invention enables users to preselect or pre-designate one or more destination content area(s) or points, and then to only perform the highlighting action in the source files or documents to produce copy/paste results without any additional mouse clicks or touching the keyboard.

According to one aspect of the related invention, the user initially designates one or more insertion points or replacement areas for receiving transferred content in a destination UI, then switches to a source UI, highlights content to be transferred, and the system performs the copy or paste operation without any additional user action, including any conversion as may be necessary.

Then, the user may simply navigate to another point in the same source, or switch to another source UI, select content, and it will be "pasted" automatically into the destination without the user having to switch back to the destination UI or perform any additional paste or insert command actions.

However, this arrangement depends on a designated destination application or document to be the point of consolidation of information from the source applications and documents. For example, if a user is creating a new document (59) using the Lotus WordPro word processor program, and there is a need to consolidate information from a Microsoft Excel™ spreadsheet (52), and image (53) from Corel Photohouse™ image editor, and a portion of a web page (56) with an associated graphic image being viewed with Netscape Navigator web browser program, as shown in FIG. 5.

In this figure, each arrow leading from a source document to the clipboard or paste buffer (500) represents an user action to switch to the appropriate application user interface (51, 52, 55) such as an Alt-Tab key combination in MS Windows, highlighting the desired content to be copied to the new document such as by clicking-and-dragging with a mouse, and executing a copy or cut operation such as by selecting Edit and Copy from a drop down list in the source application GUI (51, 53, 55). Each of these groups of operations, then, potentially involves 4 or more user actions.

Each "pasting" operation is represented by an arrow leading from the clipboard or paste buffer (500) into the new document (59). A paste operation includes switching back to the destination application user interface (57) such as by Alt-Tab key combination, then selecting a point for insertion in the new document (59) such as by clicking in the document with a mouse, and then executing a paste operation such as by selecting Edit and Paste from a drop down list in the destination application GUI (57). Each of these paste operation represents 4 or more user actions.

To further complicate matters, each application GUI may use slightly different actions to perform a cut, copy or paste. As such, just to consolidate information from three sources into one destination, 24 or more user actions may be required.

Using the invention described in the related application, this effort can be significantly reduced by allowing the user to first designate a single insertion point in the destination document, and then to visit each source and select information to be automatically transferred to the destination without returning to the GUI for the destination until all the sources have been designated.

This, though, effectively concatenates all of the selected information into one long series of information elements in the source document. Consider the following example. The user first transfers the table of numbers:

| Name | Age | Miles Driven |
|------|-----|--------------|
| Bob  | 23  | 1023         |
| Jane | 44  | 925          |
| Hal  | 58  | 2041         | from the spreadsheet to the new document. Next, the user transfers an image, which we will refer to as <Map_image>, from Corel Photohouse to the new document. Finally, the user transfers the following text and image from a web page:

"Our three drivers celebrate the conclusion of their trip to see all of the sites where Elvis Presley ate peanut butter sandwiches in public."<Group_Photo> to the new document. In such a case, the user would then return to the GUI for editing the new document, where the following content would appear:

| Name | Age | Miles Driven |
|------|-----|--------------|
| Bob  | 23  | 1023         |
| Jane | 44  | 925          |
| Hal  | 58  | 2041         |

<Map_Image>

"Our three drivers celebrate the conclusion of their trip to see all of the sites where Elvis Presley ate peanut butter sandwiches in public." <Group_Photo>

The information elements (e.g. the table, images, and paragraph) are now individually editable, and may be moved, edited, changed, deleted, etc., at will.

In many instances, though, it is desirable to maintain the relationship between the information elements for convenience of manipulation, and for source tracking. For example, the <Group_Photo> is associated originally with the web page and the paragraph "Our three drivers . . . ". As such, it may be desirable to manipulate them together (e.g. moves, deletes, updates, etc.) in the new document. Additionally, the threes lines of the table are logically associated with each other, and it may be desirable to keep them together while editing the new document.

Unfortunately, though, when the content is "pasted" using the convention means provided by most operating systems and application suites the information elements are not maintained in a logical association with each other.

Therefore, there is a need in the art for a user interface and tool which provides a way for a user to see the contents of a transfer buffer (e.g. clipboard) taken from multiple information sources (e.g. multi-highlight or multi-select), manage and change the buffer contents in a manner which maintains logical association of information elements with respect to their sources, and then to deliver that managed and manipulated information to a destination of the user's choice.

Often, however, the text which a user selects is needed as a input parameter for another computer program or function. This information may be collected from multiple places in a single or multiple documents, or may be from a single point source.

For example, if a user is reading a white paper regarding a technical subject, and in the white paper a web site address is listed as a reference for additional information, the user has two choices of how to access that information. First, the user may write down or print out the page of the document containing the URL, start a web browser program, and type the URL into the web browser to view the referenced web site. Alternatively, the user may select the URL text (e.g. highlight it) from the document if the document provides selectable text (e.g. the document is not simply an image of text such as a TIFF file), then start the web browser, and then paste the URL into the web browser's address input box. This process can be tedious and inaccurate, requiring several tries before the user is able to successfully view the desired web site. In some electronic media (e.g. web pages, PDF documents, emails, etc.), the author of the paper may specially designate certain text such that clicking on the text automatically points a web browser to an address or addresses and email, but this designation must be done at the time the paper is authored (e.g. inserting or creating a hyperlink). Thus, if the author does not anticipate or expect a reader to want to "link" or "click through" to certain information, the information will just be presented as plain text (or graphics), and the reader must resort to a manual cut-and-paste operation as just described.

In certain other software packages such as an email client, a hyperlink may be automatically assumed if the text is in a specific format. For example, an email with plain text "www.*.*" may be automatically interpreted as a hyperlink to "http://www.*.*". But, this interpretation is only valid and useful for those specific pre-defined formats of text, and is not user-definable or user-extendable.

In another example, a user may be completing an online mortgage application, and may need to get information from a banking account, paycheck stubs, and credit card statements, all of which may be available online but from separate sources and programs. In this situation, the user often writes down or prints out all of the needed information from the various sources and programs, and then re-enters it into the single screen or set of screens for the online mortgage application. This process can be very error prone, result in great frustration, and often cause additional delay in processing the mortgage application.

In some cases, the situation is worse than this because the text which is provided in the source document only remotely relates to the action the user desires. For example, if a user is reading a news article about corporate returns and he or she notices some news about a company in which the user owns stock, the user may want to check the stock price of that company. Cutting and pasting the company name from the source document directly into a web browser or finance page shown in a web browser may not be sufficient, as the user typically must input the ticker symbol into such a page instead. So, the user may have to recall or look up the ticker symbol first, then type that into a web page, after starting a web browser program if it is not already running.

In yet another situation, the user may need to collect multiple pieces of information from one or more source documents online, and then needs to save them into a single destination such as a new file. This can also be cumbersome and tedious.

SUMMARY OF THE INVENTION

A method is provided for automatically invoking a program or system function on a computer system by receiving a user-selected first insertion point or replacement area within a first user interface to a destination computer file. Subsequent to receiving the first insertion point within a destination file, a second user interface to content of a source computer file is provided upon user command. Then, responsive to a user highlighting text within the second user interface, the highlighted text is automatically copied from the application program to a clipboard buffer. Auto-trigger rules are searched for a rule which correlates to said highlighted text copied to the clipboard and, upon finding a correlating rule, one or more programs or system functions are invoked according to the found rule without need to modify or change said application program.

BRIEF DESCRIPTION OF THE DRAWINGS

The following detailed description when taken in conjunction with the figures presented herein provide a complete disclosure of the invention.

FIG. 8 shows a "clean" display option of consolidated information in our Meta Window.

FIG. 9 illustrates a rearranged set of information elements as seen in our Meta Window.

DESCRIPTION OF THE INVENTION

The present invention is preferably realized as an enhancement of the related inventions, but may be alternately realized in some embodiments as a stand alone tool or as an improvement to other products and application program. As such, the present invention will be described in detail relative to the details of the related inventions. It is within the skill of those in the art to adapt the present invention to other embodiments, when provided with the description contained herein.

Suitable Computing Platforms

The present invention is preferably realized as computer-executable code such as compiled software, scripts, or portable programs, in conjunction with existing application programs, operating systems, and computer hardware. For purposes of completeness, we first present a generalized view in FIGS. 3 and 4 of typical computer hardware and software which is suitable for realization of our invention. Many variations of these computer platform details may be made without departing from the scope of the invention, as will be readily recognized by those skilled in the art.

Common computing platforms such as personal computers, web servers, and web browsers, as well as proprietary computing platforms, may be used in realization of the present invention. These common computing platforms can include, but are not limited to, personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 1:
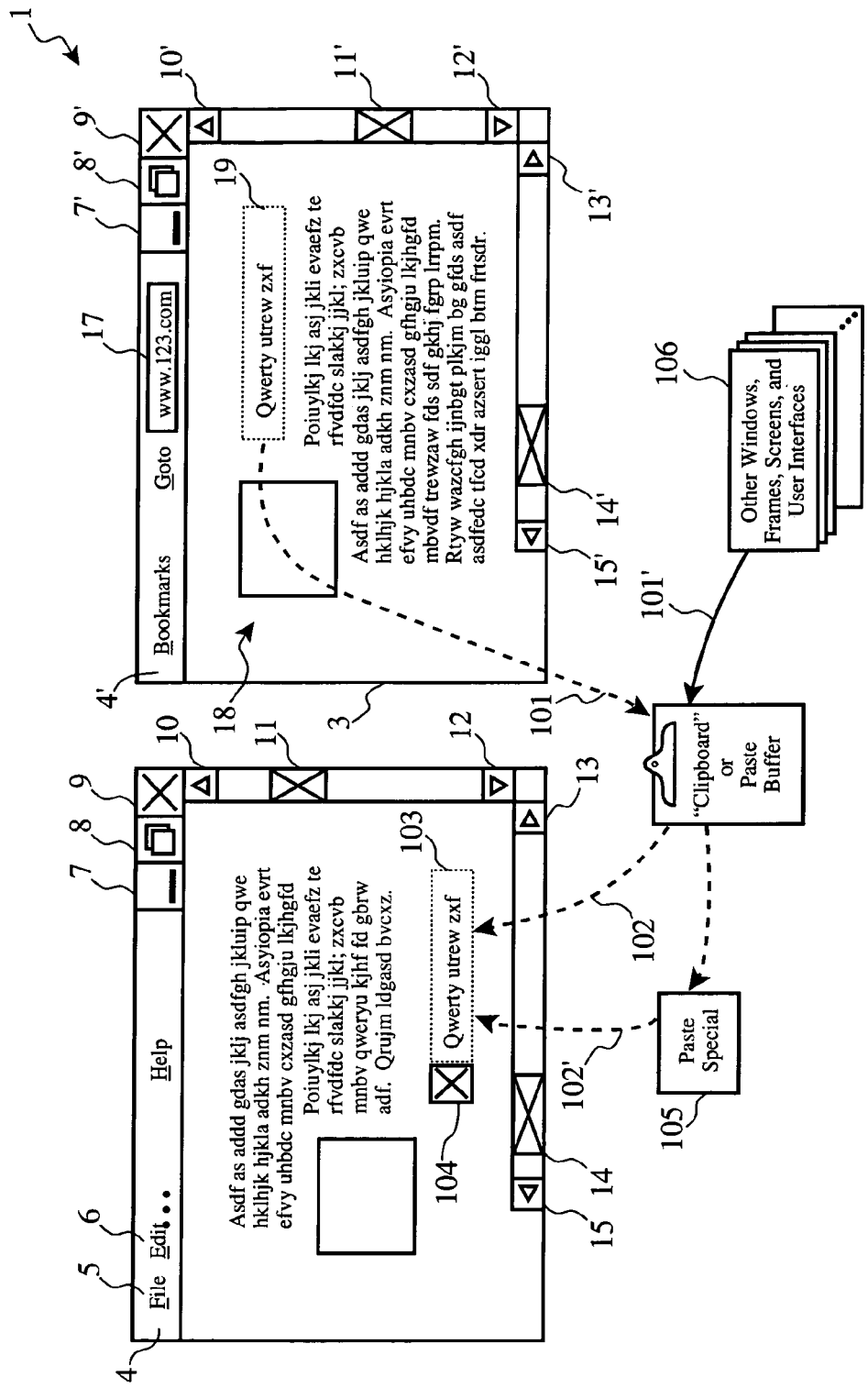
FIG. 1 illustrates the typical user interfaces and system actions of "cutting and pasting" information from one application program to another.
Figure 2:
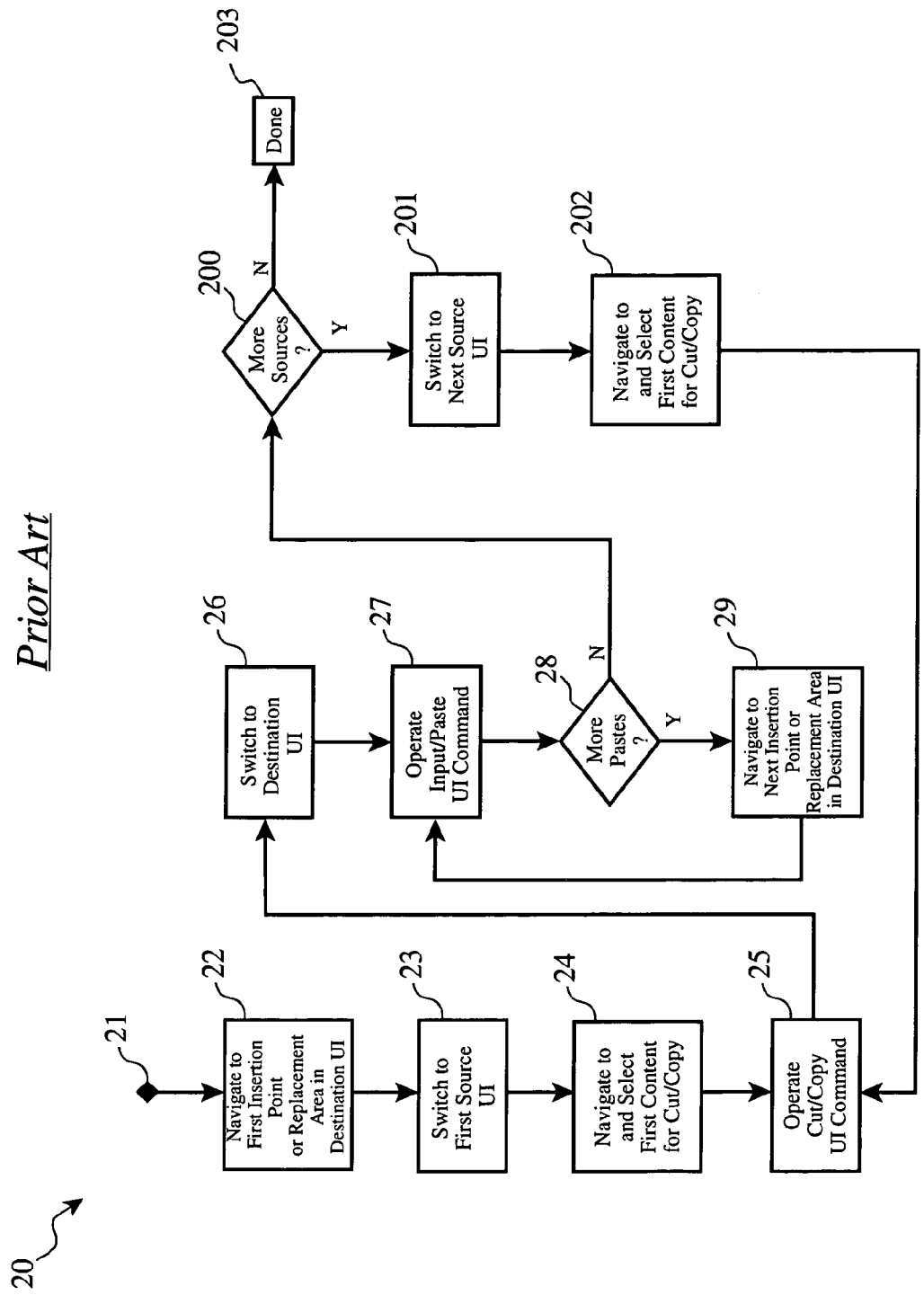
FIG. 2 shows the typical logical process in a general manner for transferring content from one application program or system function to another.
Figure 3:
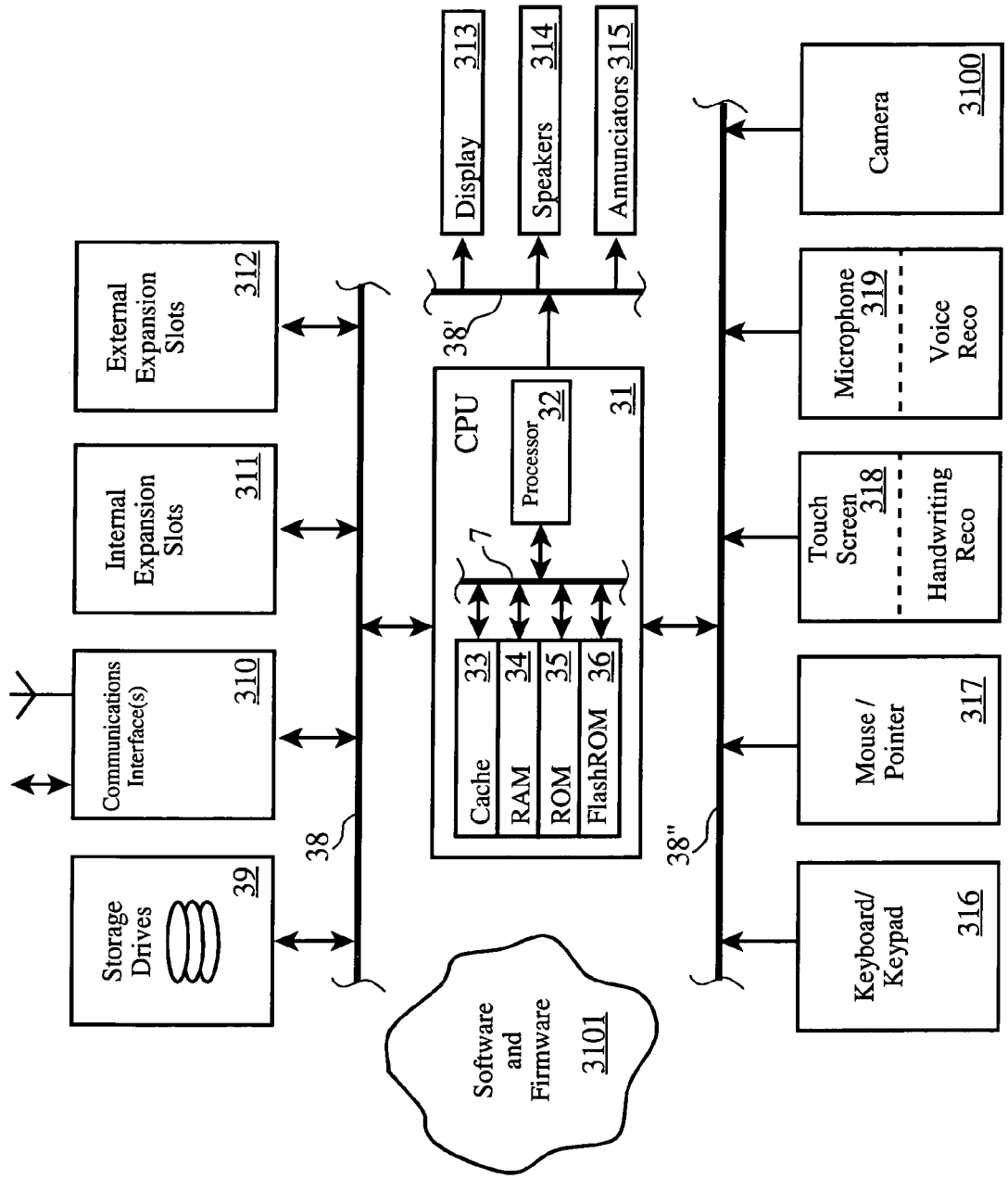
FIG. 3 depicts a generalized computing platform architecture, such as a personal computer, server computer, personal digital assistant, web-enabled wireless telephone, or other processor-based device.

Turning to FIG. 3, a generalized architecture is presented including a central processing unit (31) ("CPU"), which is typically comprised of a microprocessor (32) associated with random access memory ("RAM") (34) and read-only memory ("ROM") (35). Often, the CPU (31) is also provided with cache memory (33) and programmable FlashROM (36). The interface (37) between the microprocessor (32) and the various types of CPU memory is often referred to as a "local bus", but also may be a more generic or industry standard bus.

Many computing platforms are also provided with one or more storage drives (39), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (310), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (311), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (312) allowing the user the ability to easily install and remove hardware expansion devices, such as PCMCIA cards, SmartMedia cards, and various proprietary modules such as removable hard drives, CD drives, and floppy drives.

Often, the storage drives (39), communication interfaces (310), internal expansion slots (311) and external expansion slots (312) are interconnected with the CPU (31) via a standard or industry open bus architecture (38), such as ISA, EISA, or PCI. In many cases, the bus (38) may be of a proprietary design.

A computing platform is usually provided with one or more user input devices, such as a keyboard or a keypad (316), and mouse or pointer device (317), and/or a touch-screen display (318). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (318) is usually provided, often with handwriting recognition capabilities.

Additionally, a microphone (319), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (3100), such as a still digital camera or full motion video digital camera.

One or more user output devices, such as a display (313), are also provided with most computing platforms. The display (313) may take many forms, including a Cathode Ray Tube ("CRT"), a Thin Flat Transistor ("TFT") array, or a simple set of light emitting diodes ("LED") or liquid crystal display ("LCD") indicators.

One or more speakers (314) and/or annunciators (315) are often associated with computing platforms, too. The speakers (314) may be used to reproduce audio and music, such as the speaker of a wireless telephone or the speakers of a personal computer. Annunciators (315) may take the form of simple beep emitters or buzzers, commonly found on certain devices such as PDAs and PIMs.

These user input and output devices may be directly interconnected (38', 38") to the CPU (31) via a proprietary bus structure and/or interfaces, or they may be interconnected through one or more industry open buses such as ISA, EISA, PCI, etc.

The computing platform is also provided with one or more software and firmware (3101) programs to implement the desired functionality of the computing platforms.

Figure 4:
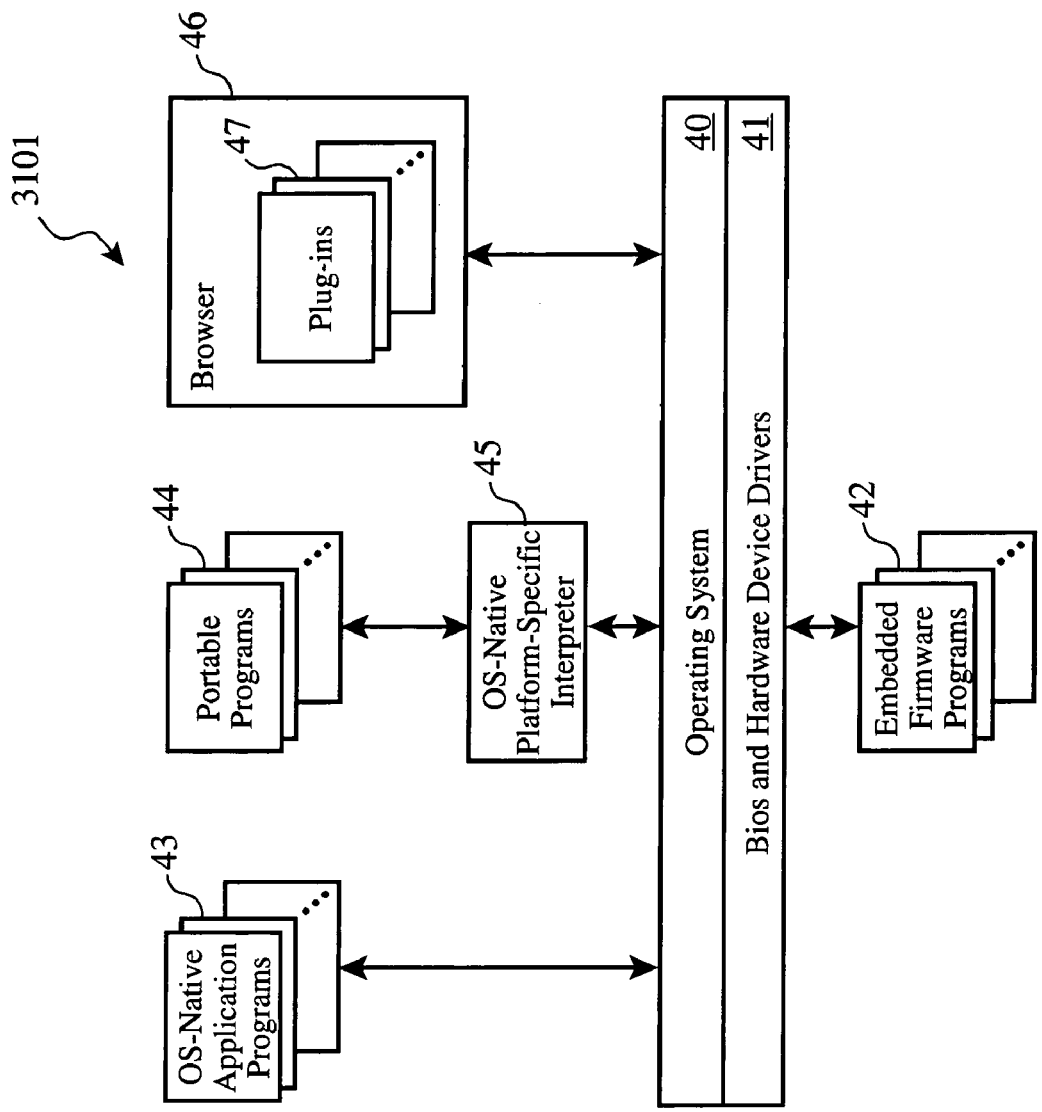
FIG. 4 shows a generalized organization of software and firmware associated with the generalized architecture of FIG. 1.
Figure 5:
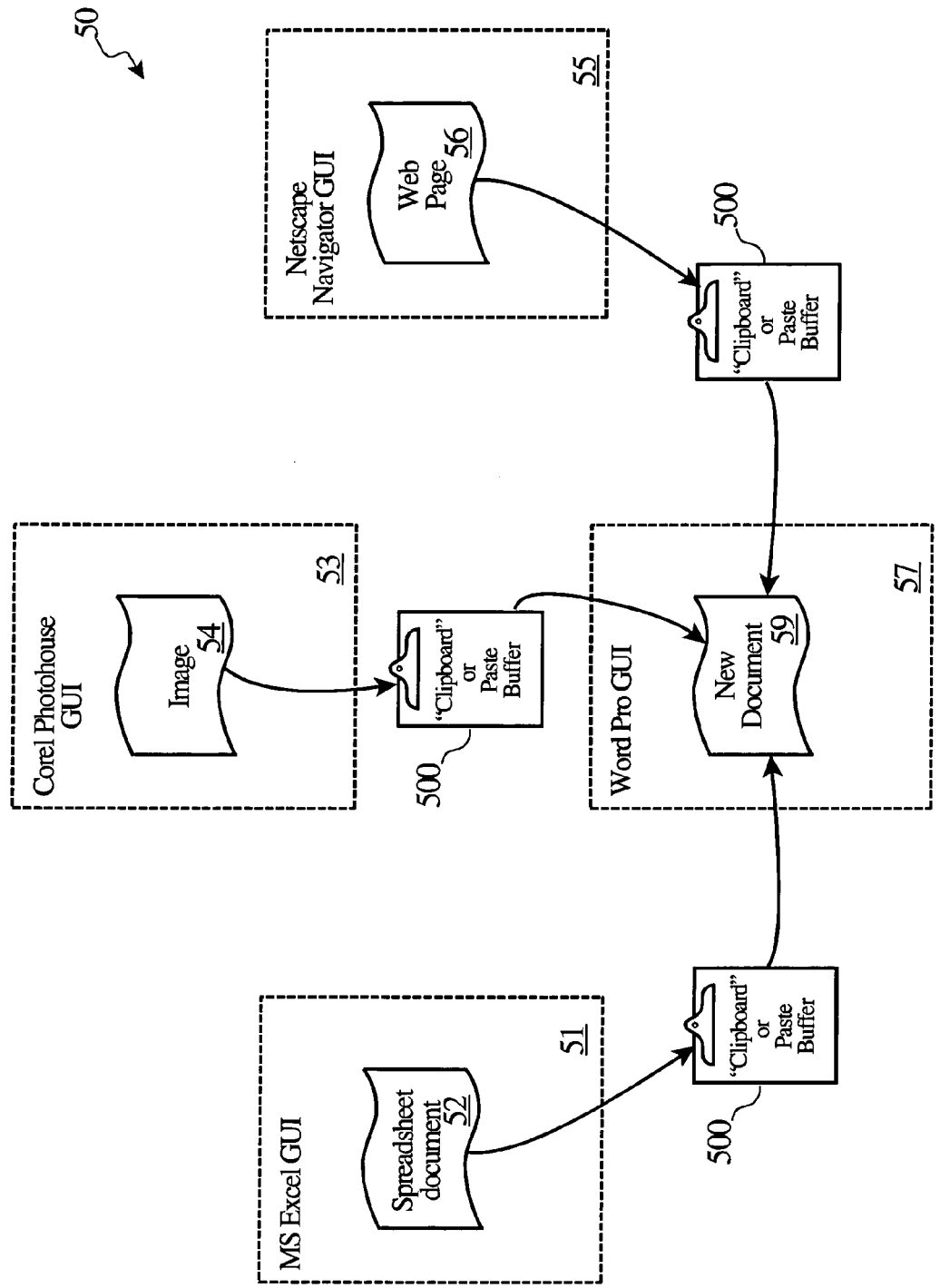
FIG. 5 illustrates a process of consolidating information from 3 sources into a new document.

Turning to now FIG. 4, more detail is given of a generalized organization of software and firmware (3101) on this range of computing platforms. One or more operating system ("OS") native application programs (43) may be provided on the computing platform, such as word processors, spreadsheets, contact management utilities, address book, calendar, email client, presentation, financial and bookkeeping programs.

Additionally, one or more "portable" or device-independent programs (44) may be provided, which must be interpreted by an OS-native platform-specific interpreter (45), such as Java™ scripts and programs.

Often, computing platforms are also provided with a form of web browser or microbrowser (46), which may also include one or more extensions to the browser such as browser plug-ins (47).

The computing device is often provided with an operating system (40), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (41) are often provided to allow the operating system (40) and programs to interface to and control the specific hardware functions provided with the computing platform.

Additionally, one or more embedded firmware programs (42) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

General Logical Process of the Meta Window

We now turn our attention to disclosure of the Meta Window related invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

In general, the auto-paste invention provides the user the ability to follow this process:

1. Declare destination content area for pasting or insertion in a destination UI;
2. Enable highlighting or selecting content to automatic copy selected information and store it in memory (e.g. buffer/clipboard) for future usage, as well as to automatically insert or paste the selected information into the pre-designated destination area;
3. Switch to source UI's, and simply highlight or select the desired content portion(s) which triggers dynamic insertion/concatenation into the declared content field.
4. Receive an automatic notification that a portion of the highlighted source information is not compatible with the destination; and
5. Define new rule or process for handling the incompatible content such as conversion, isolation and annotation, such that future similar situations are handled automatically according to the user's preferences.

Using the related auto-paste invention, advantages over presently available methods and user interfaces are:

1. User-friendly: the invention utilizes maneuvering techniques with which users are already familiar, such as double mouse clicks, dragging to highlight, etc.;
2. Convenient: the invention provides a user a new way of selecting destination for paste operations, and offers a quicker way of copy/paste by eliminating keyboard strokes, mouse clicks, navigation and toggling between different program windows and UI's.
3. Intuitive: Users can learn or "discover" that in this new mode, content highlighting triggers copy/paste effortlessly, immediately seeing the results of the highlighting action, and proceeding to experiment with various ways of applying and exploring this invention.
4. Time-Saving: Reduces time to compile information from multiple sources by making copy-paste user interface methods much more efficient.
5. Increases productivity: By reducing fatigue and tediousness in application program user interfaces, users are allowed to produce more accurate results with less effort in less time.

Figure 6:
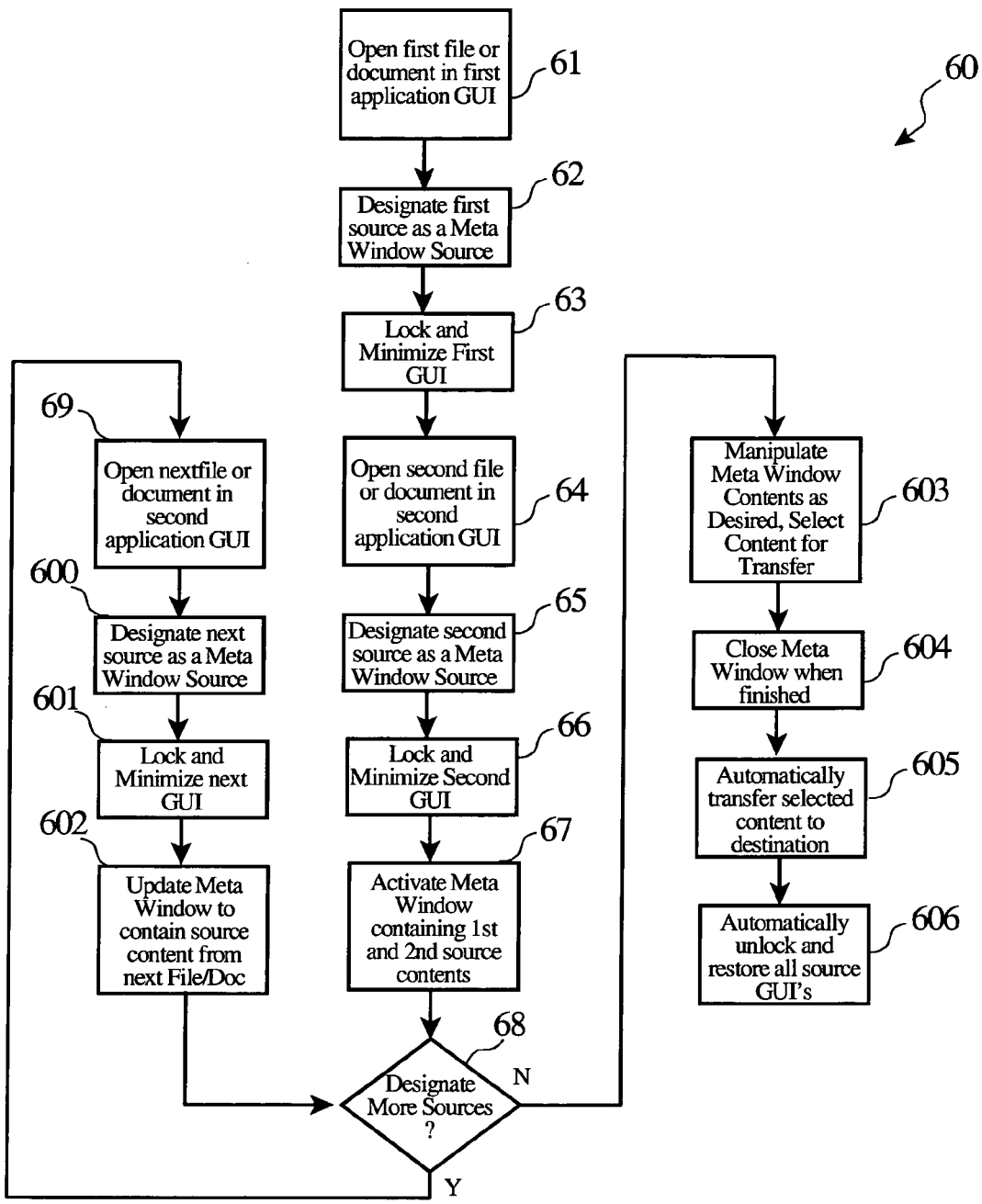
FIG. 6 illustrates a logical process according to the related and present inventions.

Turning to FIG. 6, a first logical process of the Meta Window invention is shown at a high level. This method may be implemented as compiled code, scripts, or interpretable code (e.g. Java, applets, servlets, etc.) in full or part within application programs, operating systems, server suites, utility programs, or proprietary code or hardware.

When creating or editing a new computer resource such as a computer file or document and the user wishes to insert or copy content from multiple sources to the resource being edited, the user may execute the method (60) shown. Prior to executing this process (and not shown), the user navigates to a first insertion point in the new file or document being created, and designates that point to receive the information elements from the Meta Window.

Next, the user navigates (61) to a first source application UI, and designates (62) it as a source for the Meta Window, such as by selecting a menu option or clicking on an icon. The first source application UI is then locked (63) (e.g. user changes and manipulations of content are disallowed), and preferably the UI is minimized, moved to the back of the desktop, or otherwise removed from the screen.

Then, the user navigates (64) to a second source application UI, and designates (65) it as a source for the Meta Window in a similar manner. The second source application UI is then locked (66), and preferably the second UI is minimized, moved to the back of the desktop, or otherwise removed from the screen.

Now that at least two sources have been designated, the Meta Window is displayed (67) at the forefront of the screen or desktop, in which the entire contents of the first source and second source are shown. Also, preferably, the information elements taken from both sources are maintained in logical association with each other with respect to their source, and this relationship is indicated to the user.

If (68) more sources are to be combined in the Meta Window, the user navigates (69) to each additional source UI, designates (600) the additional source as a source to the Meta Window, which locks (and minimizes, preferably) the addition source UI, and copies (602) the entire content of the additional source into the Meta Window (preferably maintaining logical association of information elements).

After all sources have been combined into the Meta Window, the user may then go to the Meta Window GUI, and manipulate (603) the information elements in groups by logical association, or individually. This manipulation may include rearranging the order in which they appear (originally, they are stored in the order they were designated as a source), deleting them, copying them, and changing them.

When the manipulated source information elements are in an acceptable form to the user, the remaining and resultant content in the Meta Window is transferred (605) to the designated destination upon closing (604) of the Meta Window. The locked source UI's are preferably unlocked (606) at this point, and preferably are restored to their original prominence on the user's computer display. Optionally, the system may be configured to leave the source UI's minimized, or to automatically close them.

Action Logs and Undo Functions

As the sources are designated, the invention preferably keeps track of these sources by an action log, such as the one shown in Table 1, which uses the previous example provided in the Background of the Invention for illustration. Here, according to our preferred embodiment, we record the action log in a markup-style language such as XML, but this can be accomplished using a number of other formats (e.g. binary, text, etc.).

TABLE 1

Example Action Log

```
<Meta_Window_action_log>
   <element_group>
      <element_group_source> "miles.xls"</element_group_source>
      <table_element>
         <row>"Name ^Tab Age ^Tab Miles Driven </row>
         <row> Bob ^Tab 23 ^Tab 1023 </row>
         <row> Jane ^Tab 44 ^Tab 925 </row>
         <row> Hal ^Tab 58 ^Tab 2041 </row>
      </table_element>
   </element_group>
   <element_group>
      <element_group_source> "Map_image.jpg"
      </element_group_source>
      <graphic_element> Map_image </graphic_element>
   </element_group>
   <element_group>
      <element_group_source> http://www.anypage.com
          </element_group_source>
      <text_element> "Our three drivers celebrate the conclusion of
          their trip to see all of the sites where Elvis Presley ate peanut
          butter sandwiches in public."
      </text_element>
      <graphic_element> Group_Photo </graphic_element>
   </element_group>
</Meta_Window_action_log>
```

Figure 7:
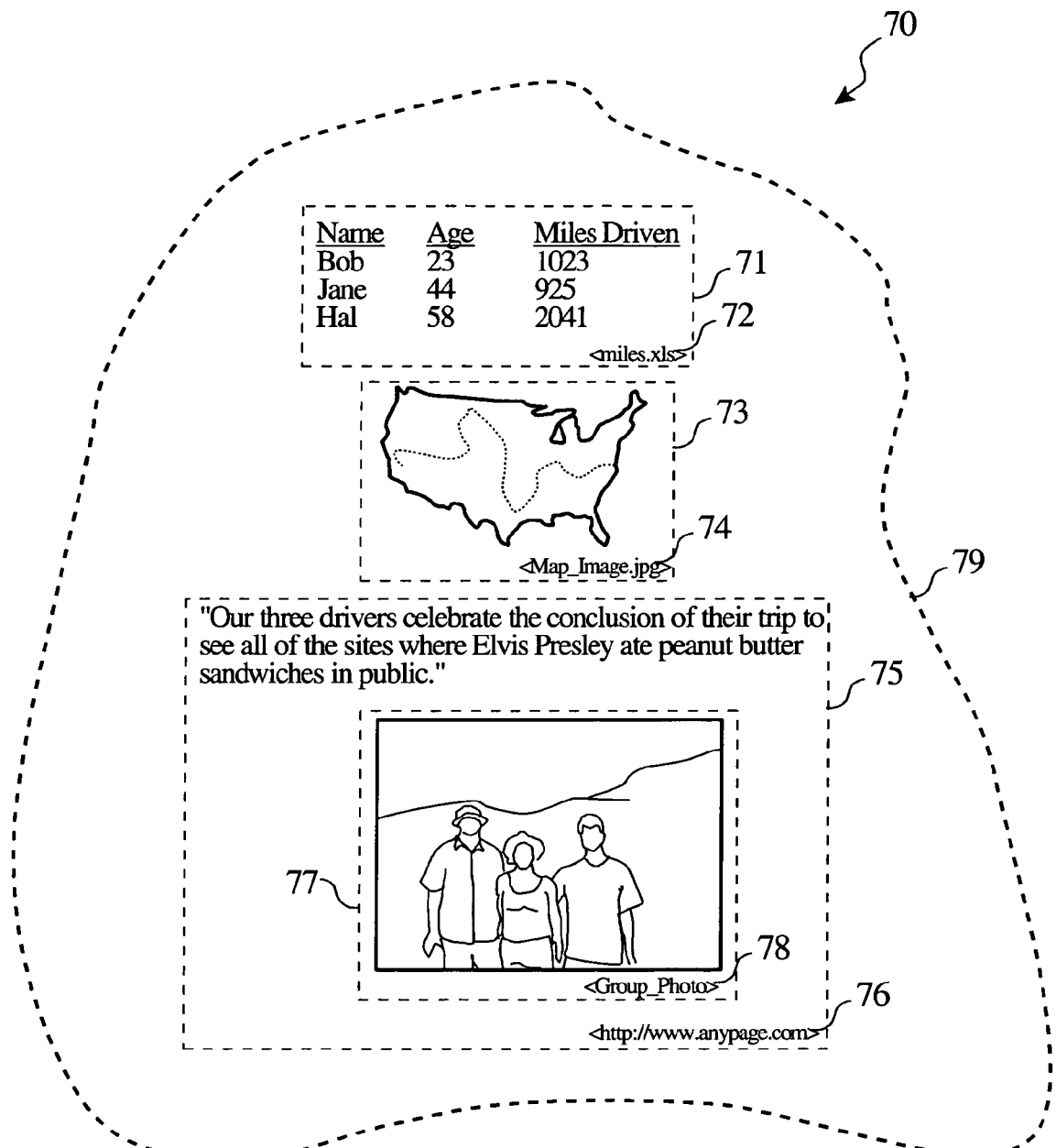
FIG. 7 shows an example graphical display of consolidated information in our Meta Window.

In this action log, which is built during the steps of designating each source, the order of designation is preserved, which represents the order that the information elements will be displayed, preferably along with indicators of logical groups according to the sources from where they were copied. FIG. 7 shows such an example display of these elements.

The initial arrangement (70) of information elements are shown on a portion (79) of a computer display in the Meta Window GUI, in the order in which they were originally designated as sources, e.g. spreadsheet table (71) first, map image (73) second, text and image (75) from web page third, as in our example.

Additionally, the logical grouping of elements are indicated to the user, such as by the display of dotted lines or shaded backgrounds, colors of text, etc., including an indicator of the source of the information elements (72, 74, 76, 78). According to a preferred embodiment, these group indicators can be suppressed (e.g. turned off), as well as the source indicators can be suppressed, to yield a layout (80) such as that shown in FIG. 8 (e.g. a clean layout view).

The user can manipulate the information elements, such as changing their order of appearance, using traditional methods within the Meta Window GUI. For example, the user may move the map image to appear last on the page, as the arrangement (90) of information elements shown in FIG. 9. This would result in a change to the action log recording this movement, such as the example given in Table 2.

TABLE 2

Example Re-arranged Action Log

```
<Meta_Window_action_log>
   <element_group>
      <element_group_source> "miles.xls"</element_group_source>
      <table_element>
         <row>"Name ^Tab Age ^Tab Miles Driven </row>
         <row> Bob ^Tab 23 ^Tab 1023 </row>
         <row> Jane ^Tab 44 ^Tab 925 </row>
         <row> Hal ^Tab 58 ^Tab 2041 </row>
      </table_element>
   </element_group>
   <element_group>
      <element_group_source> http://www.anypage.com
          </element_group_source>
      <text_element> "Our three drivers celebrate the conclusion of
          their trip to see all of the sites where Elvis Presley ate peanut
          butter sandwiches in public."
      </text_element>
      <graphic_element> Group_Photo </graphic_element>
   </element_group>
   <element_group>
      <element_group_source> "Map_image.jpg"
      </element_group_source>
      <graphic_element> Map_image </graphic_element>
   </element_group>
</Meta_Window_action_log>
```

Further according to the preferred embodiment, a Do-Undo list is maintained by the Meta Window, such that the user can reverse the effect of any operation the user performs. For example, if the user moves an element from its initial position, the Do-Undo list records the movement, including the initial position. If the user selects "Undo-Move", the element will be automatically restored to its original position. Table 3 shows an example of such a list using the previously described scenario.

TABLE 3

Example Do-Undo List

```
<Meta_Window_Do-Undo>
   <add> miles.xls </add>
   <add> Map_Image.jpg </add>
   <add> http://www.anypage.com </add>
   <group_operation>
      <delete> Map_Image.jpg </delete>
      <add> Map_Image.jpg </add>
   </group_operation>
</Meta_Window_Do-Undo>
```

In this example, the "move" of the map image is accomplished by a two-step operation of deleting the existing occurrence, and then adding it to the end of the list. If the user selects "undo-move" for this map image, the Do-Undo list may be modified in a way as shown in Table 4.

TABLE 4

Example Modified Do-Undo List

```
<Meta_Window_Do-Undo>
   <add> miles.xls </add>
   <add> Map_Image.jpg </add>
   <add> http://www.anypage.com </add>
   <group_operation>
      <delete> Map_Image.jpg </delete>
      <add> Map_Image.jpg </add>
```

TABLE 4-continued

Example Modified Do-Undo List

```
        </group_operation>
        <group_operation>
            <delete> *ALL* </delete>
            <add> miles.xls </add>
            <add> Map_Image.jpg </add>
            <add> http://www.anypage.com </add>
        </group_operation>
    </Meta_Window_Do-Undo>
```

In Table 4, one method of restoring or undoing the action is shown in which all the elements are deleted and then are restored to their original order. In alternate embodiments, the list may include element sequence numbers or indicators, and the moved element may be restored to its original sequence number. Other known methods of maintaining reversible lists of action may be employed, as well.

Enhanced Consolidation Operation

According to another aspect of the present invention, the user interface for the Meta Window is enhanced to allow "drag and drop" consolidation of source documents into the Meta Window by selecting an icon or file listing representing a source file with a mouse or pointing device (e.g. stylus, trackball, etc.), dragging the selected item onto an icon or listing for the Meta Window, and dropping them.

Figure 10:
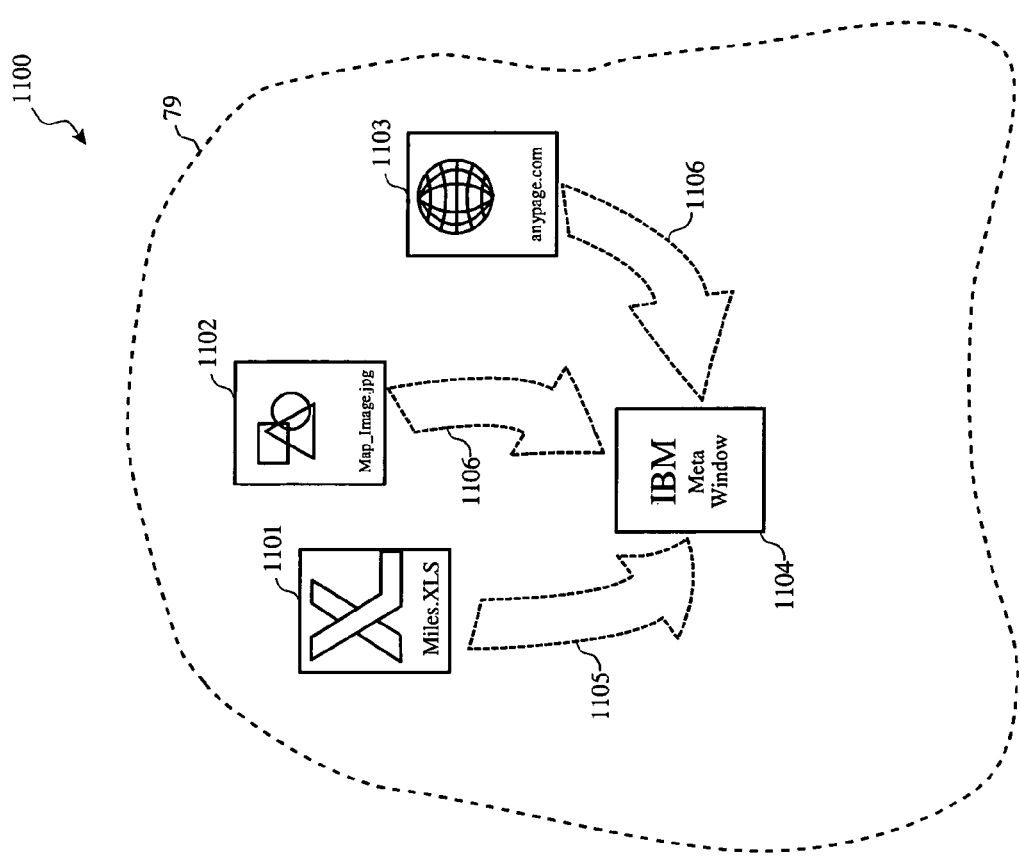
FIG. 10 depicts the drag-and-drop operation for consolidating information into our Meta Window according to an enhanced embodiment of the present invention.

FIG. 10 illustrates such a convenient operation (1100), wherein the icon (1101) for the source MS Excel™ file is first dragged and dropped (1105) onto the IBM Meta Window icon (1104). Next, the icon (1102) for the image file is dragged and dropped (1106) on the IBM Meta Window icon (1104). Finally, an icon for the source web page (1103) is dragged and dropped onto the IBM Meta Window icon (1104).

Through use of this enhanced embodiment of the present invention, all switching between application program GUI's is minimized or even eliminated, allowing the user to quickly consolidate the information into the Meta Window, where the user can go straight away to manipulating the information elements as needed.

In an alternate embodiment, a text-style listing of source files and the Meta Window program can be dragged and dropped, as well, such as dragging and dropping text listings in the MS Windows Explorer environment (when the View-Details option is selected).

Enhanced Meta Window GUI With Sub-windows

Figure 11:
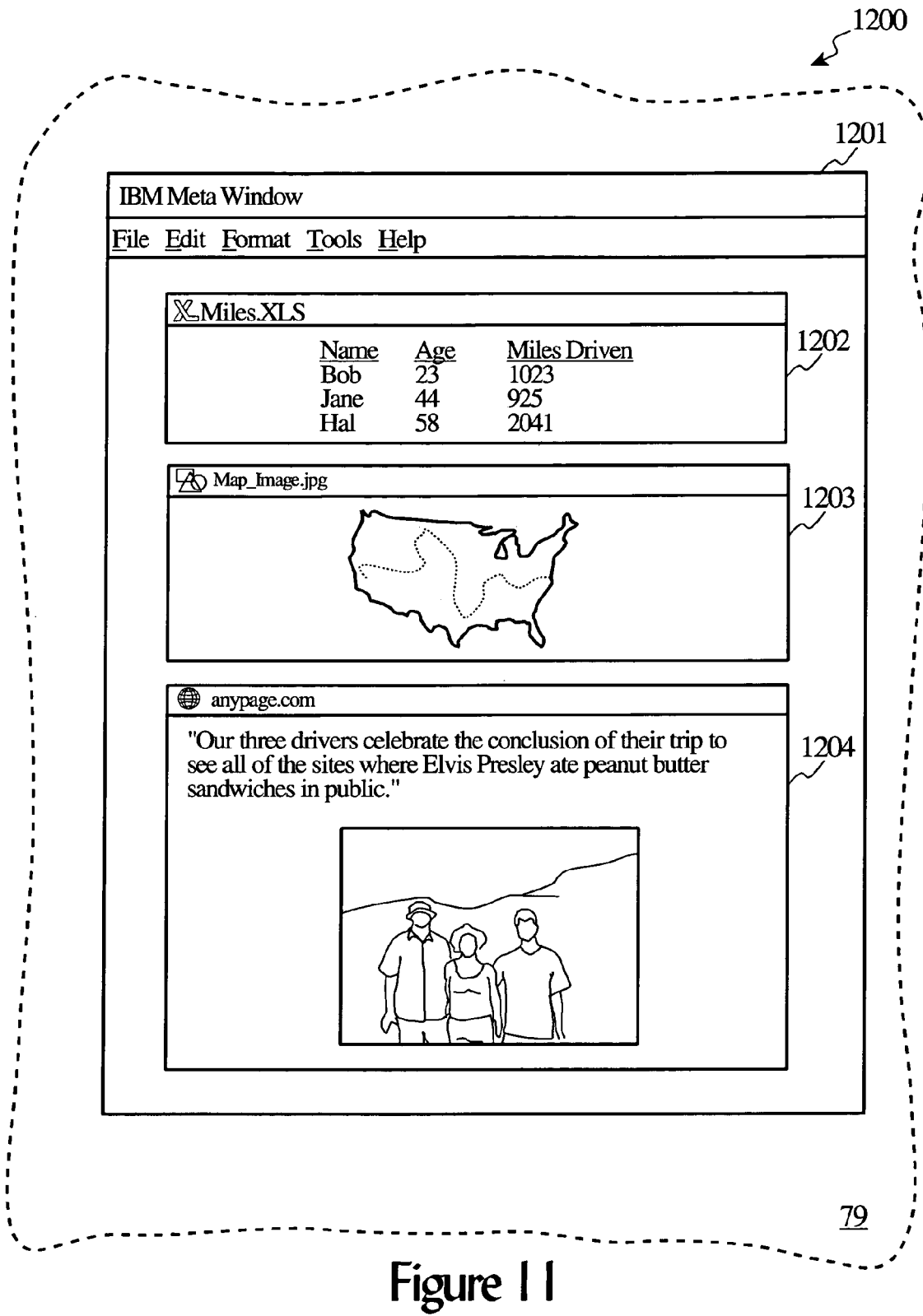
FIG. 11 illustrates an enhanced embodiment of the Meta Window GUI which provides a sub-window for each logical group of information elements.

As shown in FIG. 11, an enhanced embodiment (1200) of the present invention includes multiple sub-windows (1202, 1203, 1204) which are displayed within the Meta Window GUI (1201) on a portion (79) of the computer display. In one perspective, this is an enhanced method of showing the logical groupings of information element using a sub-window instead of a simpler encompassing line.

However, the additional functionality gained by using a sub-window to show logical groups of information elements is considerable. For example, if the consolidated information is too extensive to be simultaneously viewable on a single computer screen, then a sub-window allows the user to scroll through viewable areas of the information elements.

Refreshable Consolidation

According to another enhanced embodiment of the present invention, the Meta Window maintains a record of the source of each consolidated group of information elements as previously described (e.g. traces the source), optionally including an Object Linking Environment ("OLE") link for each group or each element as well.

The Meta Window user interface is enhanced to provide the user with the option of "refreshing" or updating the consolidated information. When this option is selected by the user, the Meta Window consolidates the information as presently available from the recorded sources, and presents the updated information in the Meta Window user interface. The user can then manipulate the information as desired, and then transfer it to the designated destination, thereby updating the destination file or computer resource with the latest available information.

Base Logical Processes of the Present Invention

Turning our attention now to the extensions or improvements to the logical processes of the related inventions, details of the present invention are now provided relative to a preferred embodiment in association with the related inventions. It will be recognized by those skilled in the art, however, that the present invention is not limited to such an embodiment, and may be realized in other forms without the full set of logical processes and functions of the related inventions.

The multi-highlighting or multi-selection functions of the related inventions is extended to include an ability to automatically trigger or kick-off a user's desired action after highlighting specific content or text. For the duration of this disclosure, we will refer to a "highlighting event" as a condition which is detected or detectable by a computer following a user's selection of text or other information elements using a conventional selection means, such as clicking-and-dragging a pointer over content, dragging a stylus over displayed content, or using a key combination such Control-Shift-Arrow keys. In some other systems, other user movements may select content, such as using a pointer or stylus to encircle text or graphics. As such, a highlighting event is a uniquely identifiable instance where the user has selected unique content, such as a specific text string or graphics element.

By automating both the invocation of one or more programs and optionally the transfer of the selected information from the source(s) to the invoked program(s), multiple user steps are eliminated, frustration is minimized, efficiency is dramatically increased, and accuracy is improved.

For example, a customer support agent in a corporate environment needs to check the status of a trouble ticket. Consider that the original trouble ticket is defined in a first database, while the resolution notes or records are contained in a second database. The agent could first look up the trouble ticket number by inputting the customer's identifier (customer number, customer name, etc.) into a user interface for the first database, retrieving the trouble ticket on screen including the trouble ticket number. Then, the agent could write down the trouble ticket number, switch to or invoke a user interface to the second database, and input the trouble ticket number from his written note to retrieve the resolution information to give to the inquiring customer. Using the present invention, the agent could define a set of actions such as these which would be automatically invoked upon highlighting of customer's identifier on the screen, or highlighting of a trouble ticket number, to automatically retrieve the status information from the second database.

Now consider an even more complex example in which a caller to a catalog order call center is inquiring on the availability or stock of multiple catalog items. Rather than perform a number of tedious individual database queries based upon a list of item numbers from the caller, a sales agent could simply highlight each item from a catalog listing using the multiple-select function of the related invention, thereby triggering a defined set of actions to check stock status using the extensions of the present invention.

The present invention can therefore be highly useful for automating inter-process transfer of data and parameters, including but not limited to:

(a) authoring or sending email messages using specified text (e.g. highlighting a person's name);
(b) initiating database queries based upon highlighted information;
(c) invoking word processors, spread sheets, and drawing programs based upon selection of pre-designated text or graphics elements; and
(d) invoking a web browser and optionally pointing the web browser or filling in form fields based upon the highlighted information.

Command Bar User Interface

According to one aspect of the present invention, a Command Bar user interface ("CBUI") is provided to allow the user to define what and how the system is to react upon detection of certain highlighting events.

Figure 12:
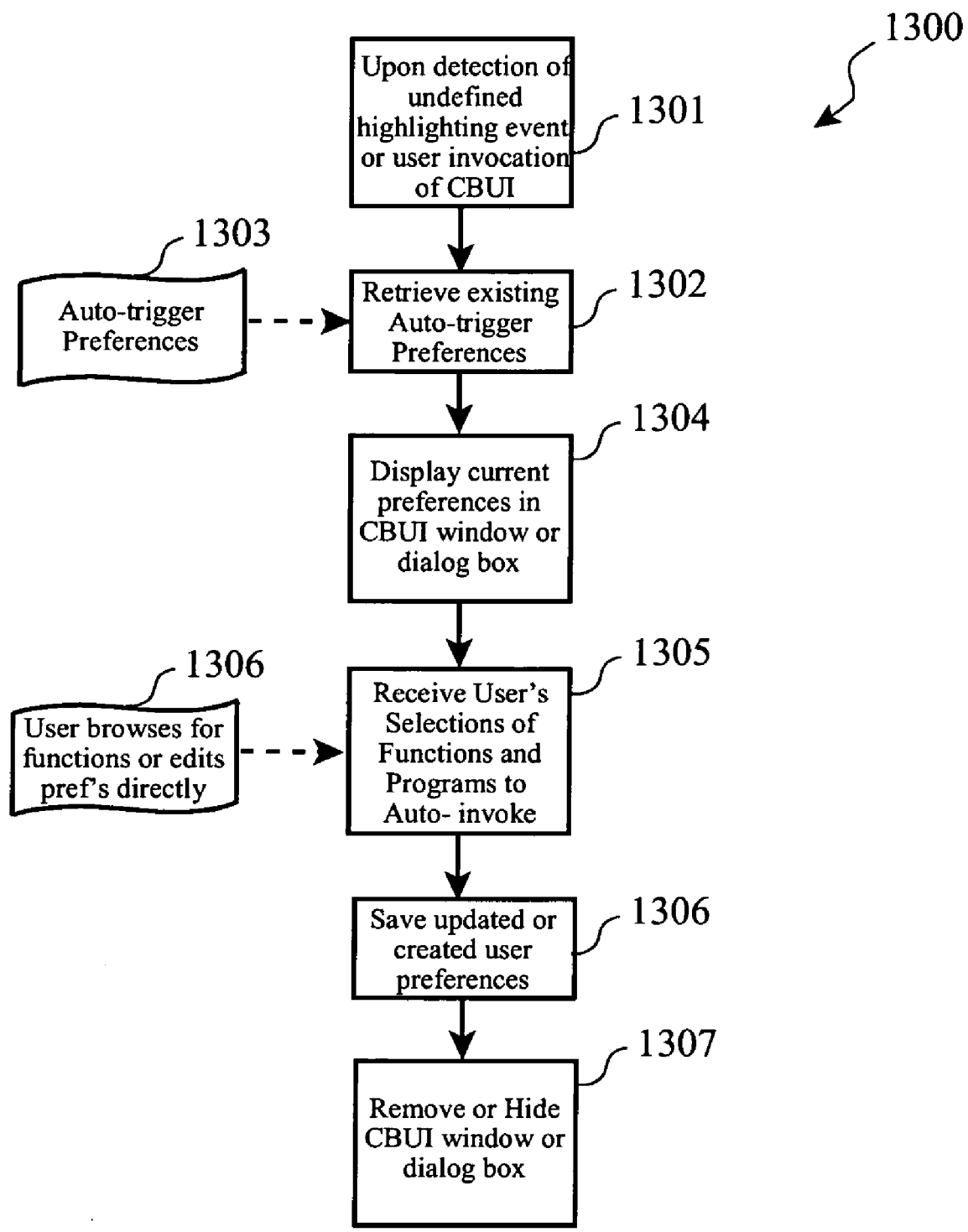
FIG. 12 sets forth a logical process according to the present invention for establishing an auto-trigger rules base.

FIG. 12 shows a logical process (1200) according to our invention which allows a user to invoke the CBUI manually, or automatically (1301). For example, the user may know that the text he or she is highlighting is already defined for automatically triggering some set of programs, but wishes to edit or change that definition. So, the user may highlight the text, and double right-click on it, for instance, to invoke the CBUI, to allow the definitions associated with the highlighted text to be modified before they are executed.

Alternatively or additionally when the system detects a highlighting event for which there is no definition already in existence, the system automatically invokes the process (1300) of FIG. 12.

First, the user's previously defined auto-trigger preferences (1303), if they exist, are retrieved (1302), and displayed in a graphical or list manner. For example, Table 5 shows such a list.

TABLE 5

Example Auto-Trigger Preferences List

```
On_Highlight_Event = "IBM":
    invoke: Netscape_Navigator_7 , URL =
    "MyWebStocks.Com/IBM";
On_Highlight_Event = " ###-#### ":
    invoke: Act! , phone_num = " ###-#### " ;
On_Highlight_Event = " *@*":
    invoke: Netscape_Messenger_7 , mailto = "*@*" ;
On_Highlight_Event = " CAT##*******":
    invoke: In_stock_query , part_num = "CAT##*******" ;
    invoke: price_query , part_num = "CAT##*******" ;
On_Highlight_Event = " ie":
    invoke: Internet_Explorer;
```

In this example, a first entry defines that upon detecting the user has highlighted or selected the text "IBM", a web browser program will be invoked pointed to a certain web address which hypothetically retrieves the latest news or stock quote for IBM. In this example, the highlighted information is static or non-variable (e.g. this specific string triggers this specific action).

In the second entry of this example set of preferences, when the user highlights or selects text which is a number in the format of three-numbers dash four numbers (e.g. the "#" symbol is a wild card for any number), a contact manager program is invoked to retrieve the records and information associated with that telephone number. This wild-card format allows the user to define a type of highlighting event which contains variables.

In the third entry, another wild card character "*" which can be any character is used to define a highlighting event of any string with an "@" symbol in the middle of it. The user has designated this highlighting event to trigger an email program, automatically passing in the "TO" address as being the selected email address.

In the fourth entry, two different database queries are invoked on highlighting a string which is of a format known by the user to be a catalog part number, one query to get a price and another to get a status of how many parts are in stock.

The fifth entry of this example set of preferences simply invokes a program, in this case Microsoft's Internet Explorer, when a specific string, "ie", is highlighted.

As these are hypothetical invocations for illustration purposes only, actual embodiment of such a list depends upon the programs themselves, their application programming interfaces ("APIs"), and the operating system of the computer on which the invention is running. It is within the skill of those in the art to adapt our list to the various computing environments where the invention may be utilized.

According to the preferred embodiment, the user's preferences for the auto-triggering action allow the user to either browse his or her system for executable programs and functions, or the system can scan for those automatically and provide a list of them from which the user can select (e.g. a drop down list).

When the user has completed his or her highlighting action, the user may signal that he or she is complete by using a similar method as used to invoke the CBUI, such as double right clicking. If the highlighted content is recognized as having an existing rule or preference, the highlighting event can be automatically processed with out further user action.

According to another aspect of the present invention, the CBUI acts as a Meta Window or intermediate viewer, allowing the user to examine and certify that the highlighted information is being transferred to the target program as needed, and if not, to make changes to the arrangement. The changes can be memorized by the system so that upon the next processing of the same highlighting event, the information is transferred to the destination program as desired. For example, if a user sets up a certain text string, perhaps $###.##, to invoke a spreadsheet program, he may then also define a row, cell and sheet number in which the highlighted text is to be entered using the CBUI.

Logical Processes to Invoke User-Defined Functions on Highlighting Event

Figure 13:
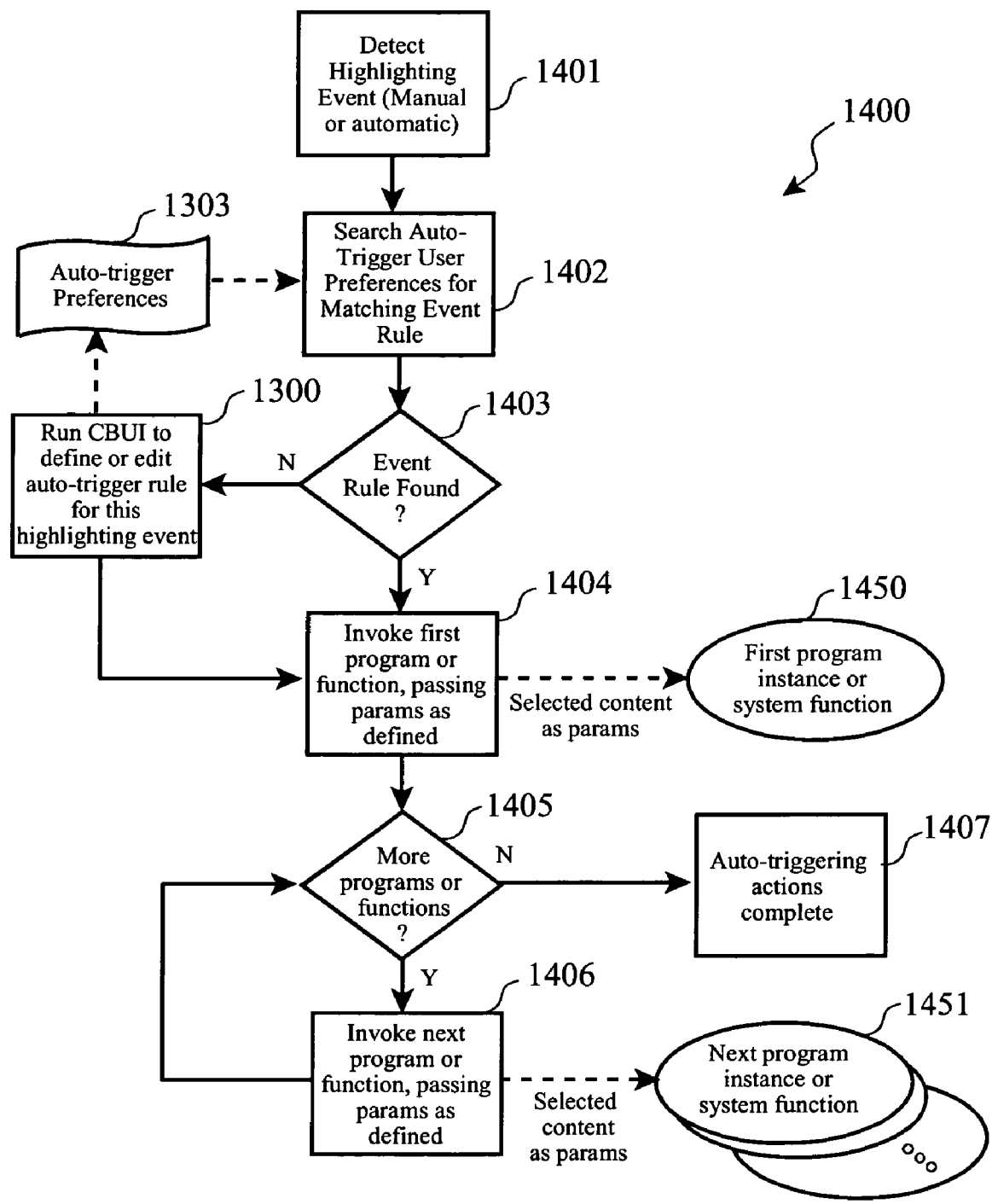
FIG. 13 sets forth a logical process according to the present invention for handling each highlighting event.

Turning to FIG. 13, a logical process (1400) according to the present invention for handling highlighting events is shown. When a highlighting event is detected (1401), either automatically or by manual indication, the user's auto-trigger preferences (1303) are accessed and searched (1402) for a matching rule for the highlighting event (e.g. a rule which contains a definition of the highlighted information or content).

If a matching rule is not found (1403), a CBUI process (1300) is performed in order to create or edit a new rule for the selected content, which is stored in the user's auto-trigger preferences (1303).

If a matching rule is found (1403), or following definition of a new rule (1300), the first program or system function (1450) according to the rule is invoked (1404), optionally passing it one or more parameters as defined by the rule.

If the rule specifies invocation of more than one program or system function (1405), then the rest of the programs and system functions (1451) are invoked, optionally passing parts or all of the selected information to them as parameters, as well.

When all programs and system functions have been invoked according to the rule for the highlighting event (1405), the auto-triggering actions are complete (1407).

Quick Path Saving

According to another aspect of the invention, one available system function for the user to employ upon certain highlighting events is a "quick path save" option which saves the highlighted information to a new file or computer resource (e.g. data structure, folder, etc.).

Currently, when a user needs to build a new file, such as a word processor file, composed of bits of information from multiple sources, he must first open the destination program and create a new file. Using the related invention, the user may perform multiple highlights to transfer to the new file automatically, optionally rearranging the selected items prior to the final transfer of the information to the new file.

However, with the implementation of the present invention, the user may specify a highlighting event rule which creates a new file automatically, and transfers the highlighted information into that file (e.g. as the transferred parameters), without needing to actually perform the manual operations to create a new file. For example, a rule such as:

On_Highlight_Event="*" AND no_other_rules_match:
   invoke: create_file_dialog<-"file_name"
   invoke: file_make->"file_name", "*";
   invoke: Act!, phone_num="###-####";

uses several special conditions to first invoke these rules for any string or content highlighted which does not correlate to any other defined rules, then to invoke a user dialog to receive a user-input file name for the new file, and then to invoke a system function to create a file with that file name and with the selected content in it.

So, for example, a user may be more specific with the file type to be created by inputting a specific file extension when answering the file name dialog, such as "MyNewFile.doc" to create a new word processor document, or "OurSpreadsheet.xls" to create a spreadsheet file. Alternatively, the rule can be defined to only collect the name of the file, and to control the file type (or extension), as follows:

On_Highlight_Event="*" AND no_other_rules_match:
   invoke: create_file_dialog<-"file_name"
   invoke: file_make->"file_name"+".doc", "*";
   invoke: Act!, phone_num="###-####";

wherein the string ".doc" is concatenated to the end of the file name provided by the user.

The Meta Window of the related invention may be invoked, as well, in order to allow the user to see and manipulate the contents of the transfer buffer prior to executing the file make and save operations.

Categorization of Selected Content

According to another aspect of the present invention, the different highlighted items may be assigned to a category of information, either using generic category names (e.g. category 1, category 2, etc.), or user-configured category names (e.g. finance, research, personal, news, sports, vacation, etc.).

Figure 14:
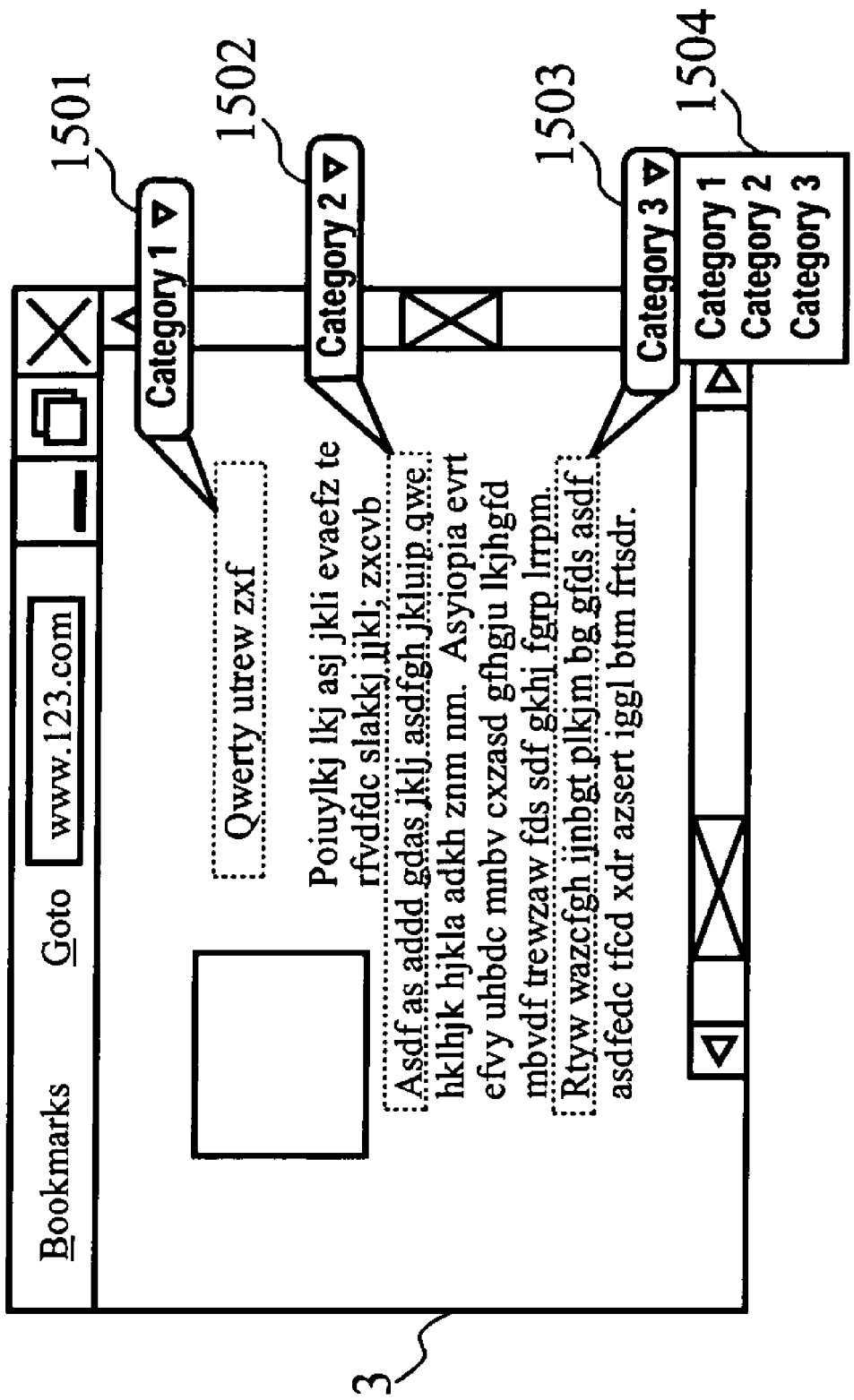
FIG. 14 illustrates a user interface which allows categorization of each selected or highlighted information element.

Turning to FIG. 14, when a user highlights each information item (such as lines of text as shown here) in a computer display (3) of a computer file, page or other computer resource, the user is given an opportunity to select or define a category for the information item, such as the drop down list (1504). Subsequently, the user is allowed to display tags (1501, 1502, 1503) which indicate to which category each item belongs, or alternatively, the tags may be temporarily displayed when a pointer is moved over a highlighted item (e.g. flyover pop up box).

Once the information categorized, it can then be handled according to the present invention and the related inventions with category as an additional criteria. For example, transfer of information to a first destination can be defined as being restricted to information elements marked "Category 1", and quick path save can be restricted to information marked as "Category 2", and only "Category 3" information may be included in a highlight event to trigger a web browser and point it to the highlighted text address.

Previous Examples Revisited

In the Background of the Invention, we described several example scenarios which were tedious and error prone under the currently available technology. Having described the invention in detail with some examples, we now turn our attention to those previous examples to illustrate the advantages of the present invention.

In one such example, we explained that in order for a text string in an electronic document to be selected an another application program to be automatically invoked upon that data, the author had to anticipate the selection of the string (e.g. insert or define a hyperlink for the string), or the application program displaying the electronic document must know in advance a format of such strings and make an assumption as to how to handle the selection of the string (e.g. assumption that "www.*.*" should always invoke a web browser pointed to that address). Other text must be handled in the traditional manner (e.g. cutting and pasting from one application GUI to another).

However, using the present invention, the user may build his or her handling preferences over time, as he or she encounters text of interest. So, for example, if the user encounters a text string "IBM" one day, the user can define a new handling operation to open a web browser, point it to a web site, and enter a ticker symbol in to a web form to get a stock quote or recent news. Later (hours or days), the same user may encounter text "Hawaii", and may define a new rule to launch or point a web browser to a discount travel web site and to look for good deals to Hawaii. Then, anytime in the future, the user can quickly execute these actions by simply highlighting "IBM" or "Hawaii" in any document, not just in applications which are pre-programmed for such operations (e.g. no hyperlink has to be defined in the document, and no format assumption has to be made by the presenting application program).

In another previous example, we explained how a user had to cut-and-paste information from multiple sources into an online mortgage application form, which could be very frustrating and error prone. Using the present invention, the user could define handling actions which automatically transferred highlighted information from one source to another based upon his or her recently configured rules, using wild card operators if necessary. For example, the user could define ###-##-#### as a social security number, and define its destination the mortgage forms. Then, when he or she is finished completing the application, the rules could be deleted.

CONCLUSION

The present invention may be realized in a variety of forms, programming languages, methodologies, and operating systems on a variety of computing platforms without departure from the spirit and scope of the present invention. A number of example embodiment details have been disclosed as well as optional aspects of the present invention in order to illustrate the invention, but which do not define the scope of the invention. Therefore, the scope of the present invention should be determined by the following claims.

What is claimed is:

1. A method of automatically invoking a program or system function on a computer system comprising the steps of:
   receiving a user-selected first insertion point or replacement area within a first user interface to a destination computer file;
   subsequent to receiving said first insertion point within a destination file, providing a second user interface to content of a source computer file upon user command;
   subsequent to providing said second user interface to said source file, responsive to a user highlighting text within said second user interface of an application program on a computer display, automatically copying said highlighted text from said application program to a clipboard buffer, wherein said application program comprises an application program selected from a group of a word processor, a spreadsheet, a contact management utility, an electronic address book, an electronic calendar, an email client, a presentation program, a financial program, and a bookkeeping program;
   searching a plurality of auto-trigger rules for a rule which correlates to said highlighted text copied to said clipboard; and
   upon finding a correlating rule, invoking one or more programs or system functions according to said found rule without need to modify or change said application program.

2. The method of claim 1 further comprising:
   upon determining that no auto-trigger rule exists correlated to said highlighting event, providing a user interface to define a new rule or edit an existing rule so as to produce a rule correlating to the highlighting event.

3. The method as set forth in claim 1 further comprising repeating said steps of responding to a highlighting event, searching auto-trigger rules, and invoking programs or system functions, upon receipt of a plurality of completions of highlighting a plurality of text by said user, and wherein said repeated steps further comprises consolidating said plurality of highlighted text into a single destination program input, system function input, or file.

4. The method as set forth in claim 1 wherein said step of invoking one or more programs or system functions comprises passing said highlighted information items to said invoked programs, to said system functions, or to both invoked programs and system functions as input parameters.

5. The method as set forth in claim 1 wherein said step of invoking one or more programs or system functions comprises one or more actions to create a new file and saving said information items in said new file.

6. The method as set forth in claim 1 further comprising the steps of:
   categorizing said information items in one or more user-selected categories; and
   including a category criteria in said auto-trigger rules as a condition for matching a highlighting event.

* * * * *